(No Model.)

J. H. WEIN.
SAFETY PIN.

No. 488,931. Patented Dec. 27, 1892.

Witnesses

Inventor
John H. Wein,
by F. B. Brock
Attorney

UNITED STATES PATENT OFFICE.

JOHN H. WEIN, OF HELENA, MONTANA, ASSIGNOR OF SEVEN-TENTHS TO HERMAN FLIGELMAN, FRED A. FLIGELMAN, AND SAMUEL S. SINGER, OF SAME PLACE.

SAFETY-PIN.

SPECIFICATION forming part of Letters Patent No. 488,931, dated December 27, 1892.

Application filed May 11, 1891. Serial No. 392,368. (No model.)

*To all whom it may concern:*

Be it known that I, JOHN H. WEIN, a citizen of the United States, residing at Helena, in the county of Lewis and Clarke and State of Montana, have invented a certain new and useful Improvement in Safety-Pins; and I do hereby declare the following to be a full, clear, and exact description of the invention, such as will enable others skilled in the art to which it appertains to make and use the same.

My invention relates to pins.

The object of my improvements is to provide a safety pin with a means for locking the same in addition to that now generally in use; and also to provide a safety pin which shall be simple, cheap, and more efficient in operation than any heretofore devised.

Heretofore, in the use of safety pins designed more particularly for body or personal wear, they have been very liable to become unlocked and to inflict serious injury upon the wearer.

To remedy these objections my invention consists in the following construction of parts, which will first be fully described in detail and the novelty feature then set forth and claimed.

Figure 2:
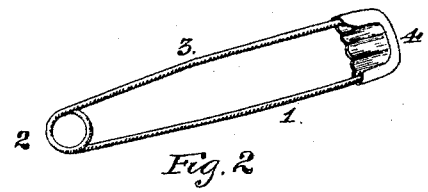
Figure 1:
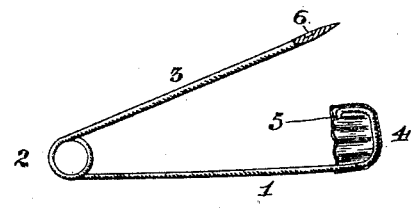
Figure 3:

Figure 1 is a side view of a safety pin to which my improvements have been applied, the pin guard being broken away to show the interior arrangement. Fig. 2 is an elevation or side view. Fig. 3 is a detail view of the pin point.

In the drawings—1 represents the shank of the pin.

2 is the usual loop at one end of the shank.

3 is the pin springing from the loop 2 and pointed in the usual way.

4 is a pin guard at the opposite end of the shank 1 and which may be of any of the known constructions. The pin guard end of the shank is looped and doubled upon itself in the usual way and at its extremity it is bent, formed, or otherwise made into a hook projection 5.

6 is a depression or slot punched, or otherwise formed, on the outer side of the pin 3 near its point in such position that when the pin is pressed into the guard the hook projection 5 enters the depression 6 in the pin, and thereby locks the pin securely in place within the pin guard. It is preferred not to punch the slot 6 clear through the pin as it would have a tendency to weaken it at that point.

My improved safety pin will lock with a certainty and security hitherto unattained in safety pins of this type, the pins themselves, in practice withstanding a bursting pressure of thirty or forty pounds.

By forming the hook projection on the end of the wire itself; and stamping or punching the depression in the pin, the safety pin may be as cheaply constructed as those now on the market and which will be vastly more reliable.

Instead of turning up the wire loop into a hook projection, I may form the projection or engaging edge on the guard itself, and notch the pin on the outer side to engage therewith.

I do not wish to be understood as claiming any such construction as is shown, for instance, in the cuff holder patent of A. W. Sawyer No. 390,908 dated October 9, 1888, in which the material to which the holder is attached is clamped in between an opening in spring plate and a hook shaped arm opposite thereto—my invention being applied to safety pins where the fabric does not enter in between the locking parts of my pin, but within the parallel parts thereof.

The use and function of my improvement are different from the use and function of a cuff holder such as Sawyer's, and as articles of manufacture enter widely different fields.

What I claim as new and desire to secure by Letters Patent, is:—

The safety pin herein described, consisting of a shank, having a loop at one end bent back upon itself, and its extremity 5 given a sharp turn inwardly at right angles to form a hooked catch, and a pin at the other end, said pin being provided with a depression upon its outer side near the point, and a hood or guard enveloping both the loop and its hooked catch, substantially as set forth.

In testimony whereof I affix my signature in presence of two witnesses.

JOHN H. WEIN.

Witnesses:
L. F. LA CROIX,
H. LOBLE.